United States Patent [19]
Tasdighi et al.

[11] Patent Number: 5,923,208
[45] Date of Patent: Jul. 13, 1999

[54] LOW VOLTAGE TEMPERATURE-TO-VOLTAGE CONVERTER

[75] Inventors: Ali Tasdighi; Chuong Nguyen, both of San Jose, Calif.

[73] Assignee: Telecom Semiconductor, Inc., Mountain View, Calif.

[21] Appl. No.: 08/713,574

[22] Filed: Sep. 12, 1996

[51] Int. Cl.$^6$ .............. H01L 35/00; H03K 3/42
[52] U.S. Cl. ............................ 327/512; 327/538
[58] Field of Search .................. 327/51, 52, 54, 327/65, 67, 72, 73, 80–83, 87, 89, 90, 512, 513, 538, 541, 543, 560–563, 362; 323/907, 313

[56] References Cited

U.S. PATENT DOCUMENTS

| | | | |
|---|---|---|---|
| 4,887,181 | 12/1989 | Lenz | 327/512 |
| 5,231,316 | 7/1993 | Thelen, Jr. | 327/513 |
| 5,373,226 | 12/1994 | Kimura | 327/513 |
| 5,434,533 | 7/1995 | Furutani | 327/513 |

*Primary Examiner*—My-Trang Nu Ton
*Attorney, Agent, or Firm*—Shjerven, Morrill, MacPherson, Franklin & Friel LLP; Brian D. Ogonowsky

[57] ABSTRACT

A temperature-to-voltage converter includes a first circuit for developing a signal having a positive temperature coefficient and a second circuit for developing a signal having a voltage offset and a negative temperature coefficient. The converter also includes an adder circuit configured to subtract the negative-temperature-coefficient signal from the positive-temperature-coefficient signal. The resulting difference signal is a low voltage that exhibits linear temperature-to-voltage conversion, allowing the converter to be powered by a low operating voltage.

17 Claims, 4 Drawing Sheets

LOW VOLTAGE TEMPERATURE-TO-VOLTAGE CONVERTER

FIELD OF THE INVENTION

The present invention relates generally to temperature sensors, and more particularly to temperature-to-voltage converters for integrated circuits.

BACKGROUND

Temperature sensing circuits are commonly used in integrated circuits to protect against operation at excessive temperatures.

Temperature sensing circuits provide an output signal (typically a voltage level) that varies with temperature. This output signal conventionally provides temperature-dependent feedback to a control circuit in an integrated circuit. By monitoring the temperature-dependent feedback, the control circuit is able to respond to increased operating temperatures by, for example, shutting down the integrated circuit or decreasing the operating speed of the integrated circuit.

Temperature sensing circuits conventionally convert temperature to voltage using the thermal voltage (i.e., KT/q), conventionally expressed as $V_T$, multiplied by some constant n. Expressed mathematically, such temperature sensing circuits may output a voltage $V_O = nV_T$ that varies with temperature according to a known relationship. At present, the accepted standard for temperature-to-voltage converters calls for a change in output voltage $V_O$ of 10 mV/°C. (i.e., $dV_O/dT=10$ mV/°C.). However, the thermal voltage $V_T$ changes at only about 0.1 mV/° C. (i.e., $dV_T/dT=0.1$ mV/°C). Thus, the constant n is selected to be approximately one hundred (i.e., 10 mV/°C÷0.1 mV/°C.) so that the output voltage $V_O$ varies with temperature at the standard 10 mV/°C.

Unfortunately, conventional temperature-to-voltage converters that provide an output voltage $V_O$ based upon the thermal voltage $V_T$ provide relatively high output voltage levels at relatively high expected operating temperatures. Thus, circuits using such temperature-to-voltage converters impose a fairly high lower limit on the usable power supply voltage. One solution to this problem has been to create a fixed offset for the output voltage $V_O$ using a band-gap generator; however, that solution is expensive, for it requires substantial silicon real estate.

What is needed is a simple, low cost, temperature-to-voltage converter that provides a low output voltage $V_O$ so that it can be operated with a low supply voltage.

SUMMARY

A temperature-to-voltage converter in accordance with the present invention includes a first circuit for developing a signal having a positive temperature coefficient and a second circuit for developing a signal having a voltage offset and a negative temperature coefficient. The converter also includes a voltage adder circuit configured to subtract the negative temperature coefficient signal from the positive temperature coefficient signal. The negative temperature coefficient signal is used as a voltage offset to lower the output voltage. The resulting difference signal exhibits linear temperature-to-voltage conversion. In the preferred embodiment, the negative temperature coefficient signal is created by the base-emitter drop across a single transistor, and, hence, the resulting circuit is much smaller than prior circuits. In one embodiment, the operating voltage for the converter is 2 volts or less.

In one embodiment, the adder circuit is implemented using an operational amplifier. A feedback circuit connected to the output terminal of the operational amplifier develops a feedback voltage, related to the base-emitter voltage of a transistor, having a negative temperature coefficient. This feedback voltage is applied to the inverting input of the operational amplifier. In the preferred embodiment, the transistors forming the operational amplifier are configured to generate the positive temperature coefficient signal to further reduce the size of the temperature sensor.

BRIEF DESCRIPTION OF THE FIGS.

Figure 3:
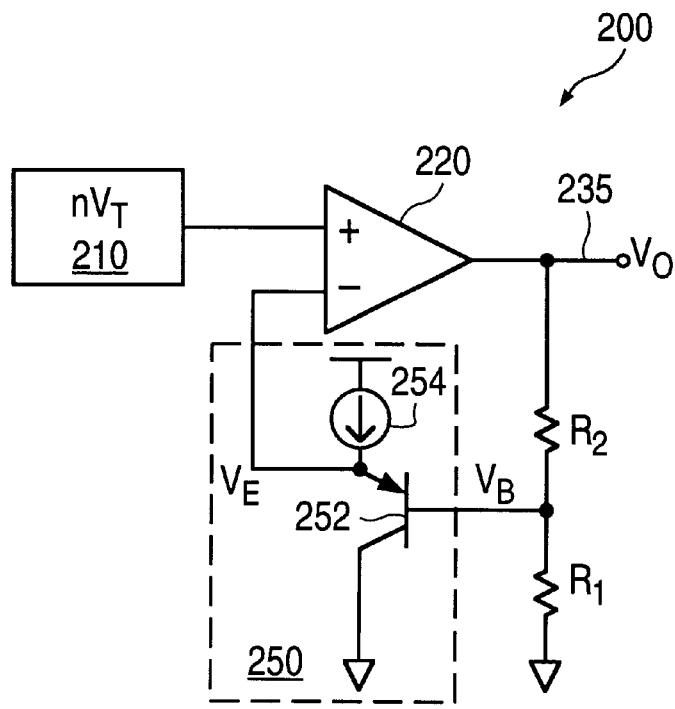

FIG. 3 is a schematic diagram of an embodiment of converter 200 in which feedback circuit 250 includes a PNP transistor 252 and a current source 254 configured as a common-collector amplifier.

Figure 2:
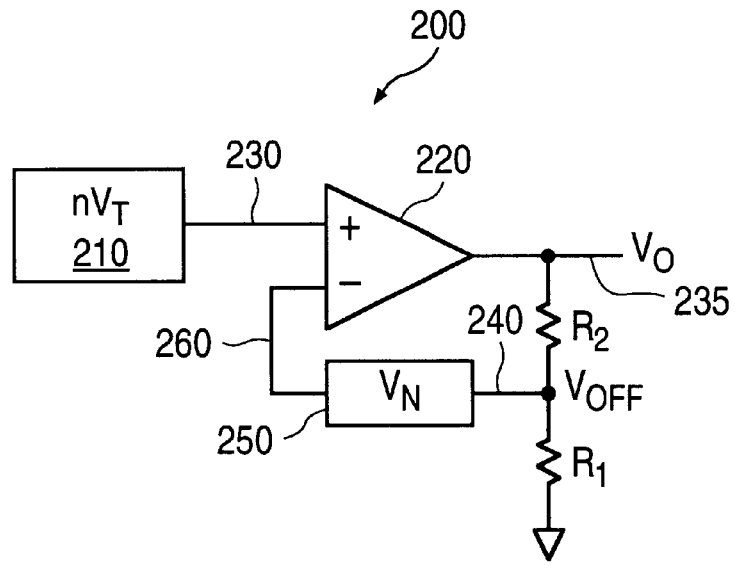
FIG. 2 is a schematic diagram of a temperature-to-voltage converter 200 in accordance with one embodiment of the present invention.
Figure 4:
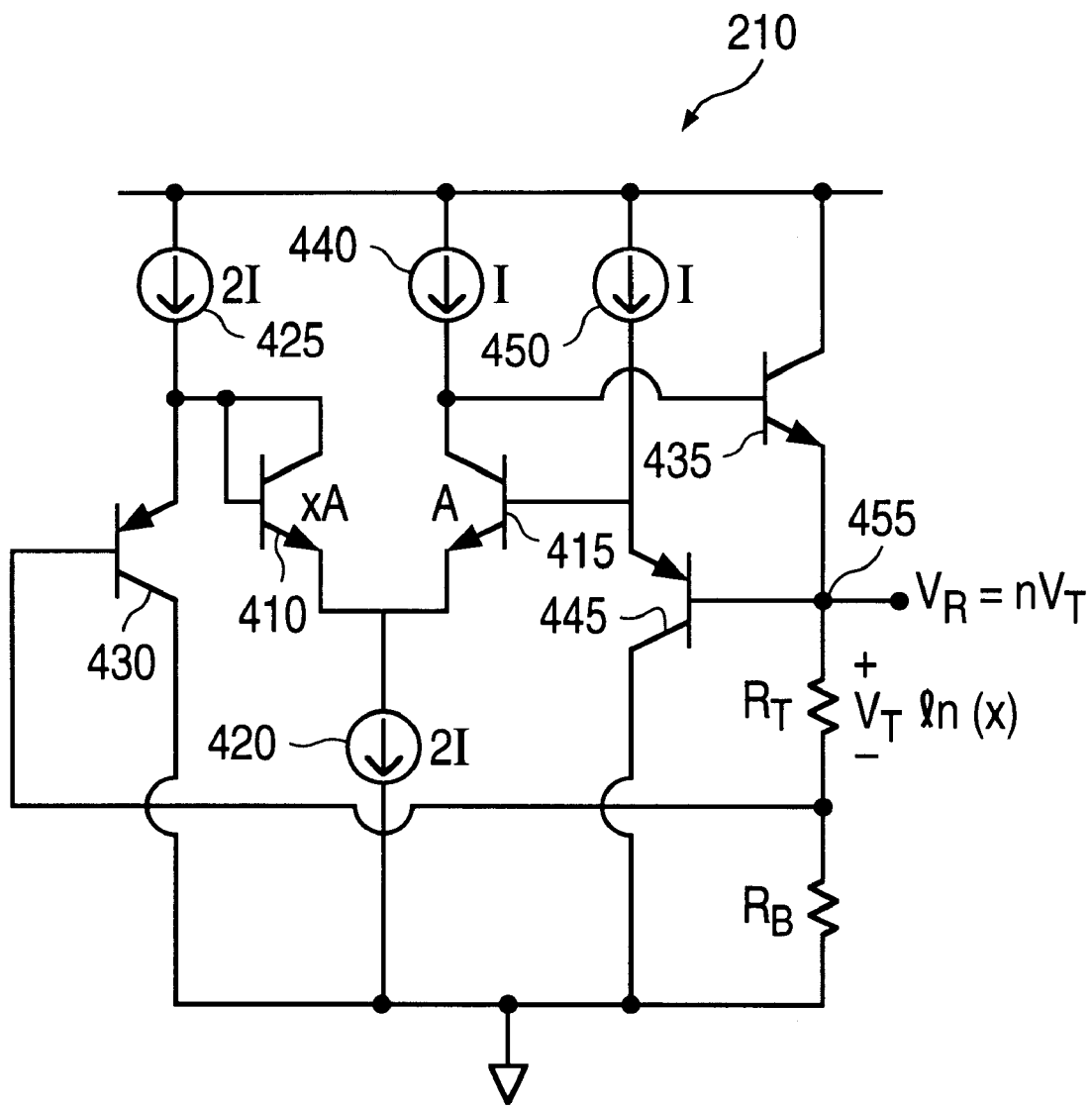

FIG. 4 is a schematic diagram an embodiment of input circuit 210 of FIG. 2.

Figure 5:
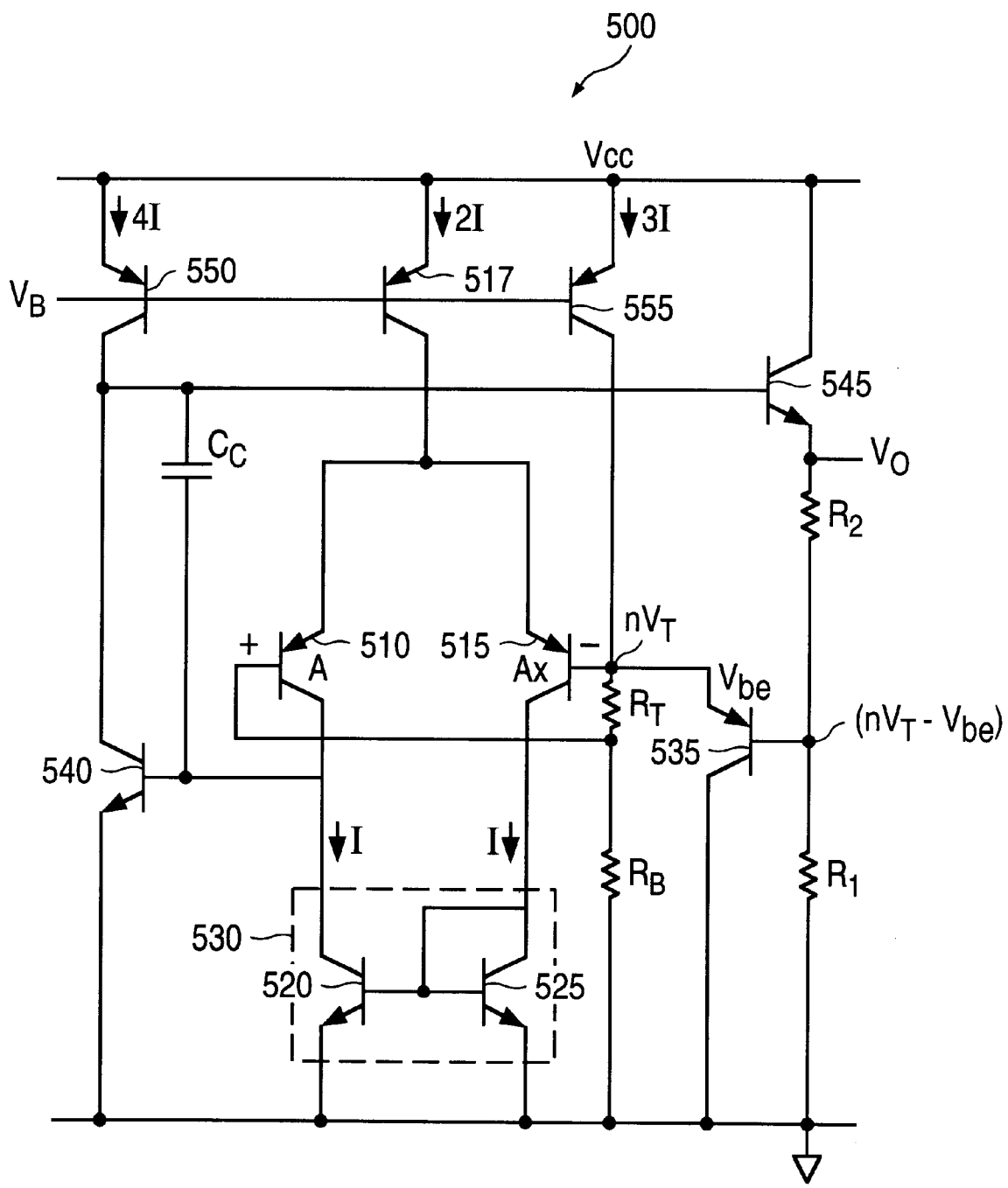

FIG. 5 is a schematic diagram of a temperature-to-voltage converter 500 that combines the functionality of input circuit 210, operational amplifier 220, and feedback circuit 250 of FIG. 2.

DETAILED DESCRIPTION

Figure 1:
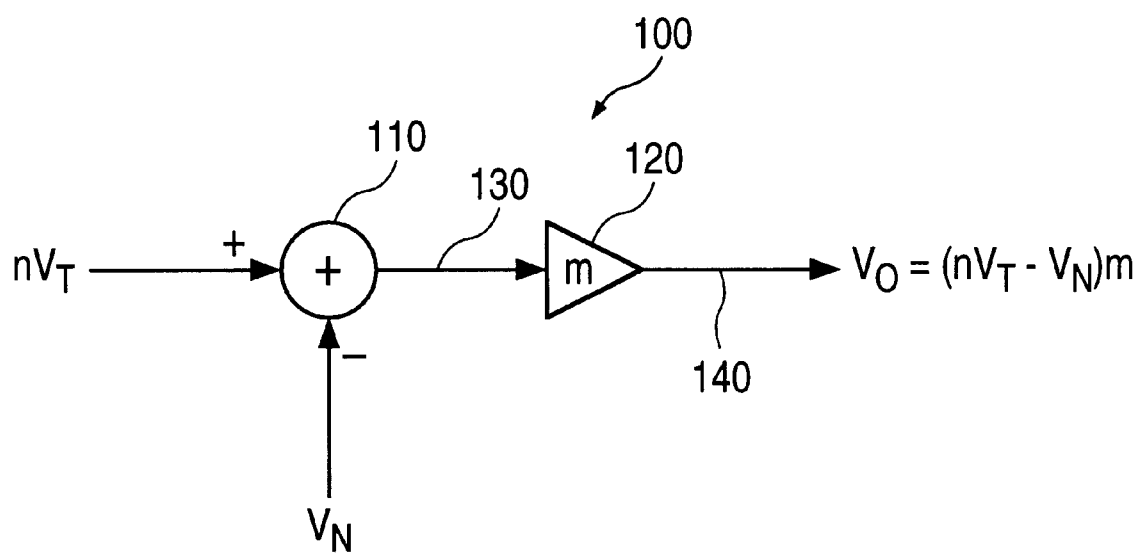
FIG. 1 is a symbolic diagram of a temperature-to-voltage converter 100 in accordance with the present invention.

FIG. 1 is a symbolic diagram of a temperature-to-voltage converter 100 in accordance with the present invention. Temperature-to-voltage converter 100 includes an adder 110 connected to an amplifier 120 via a line 130. The output voltage $V_O$ of temperature-to-voltage converter 100 is provided from the output terminal of amplifier 120 on a line 140.

Adder 110 is connected to a positive temperature coefficient voltage $nV_T$ and to a negative temperature coefficient voltage $V_N$, where $V_T$ is equal to the well known quotient KT/q, where K is Boltzmann's constant, T is temperature in Kelvin, and q is the charge of an electron. In one embodiment, negative temperature coefficient $V_N$ is based on the base-emitter voltage ($V_{BE}$) drop across a transistor and varies at approximately −2 mV/°C. (i.e., $dV_N/dT=-2$ mV/°C.). The "+" and "−" signs adjacent adder 110 indicate that negative temperature coefficient voltage $V_N$ is subtracted from positive temperature coefficient voltage $nV_T$. (The term adder is being used in its formal sense to include both a summer and a subtractor.)

Amplifier 120 provides amplification of the signal on line 130 by a factor m. Thus, the output voltage $V_O$ of temperature-to-voltage converter 100 on output terminal 235 is:

$$V_O = (nV_T - V_N)m \qquad \text{[EQ. 1]}$$

or $$V_O = mnV_T - mV_N \qquad \text{[EQ. 2]}$$

As compared with conventional temperature-to-voltage converters that rely on a positive temperature coefficient voltage $nV_T$ alone to provide a temperature coefficient, temperature-to-voltage converter 100 provides a lower output voltage $V_O$, and consequently enables the use of a lower operating voltage in many applications.

The temperature-to-voltage relationship of output voltage $V_O$ may be set by selecting appropriate values for multipliers n and m. In the following example, n and m are selected so that temperature-to-voltage converter 100 provides an output voltage $V_O$ that varies, at the industry standard rate of 10 mV/°C., from 300 mV at room temperature (25° C.) to 2 volts at approximately 200° C.

At room temperature (25° C.), $V_T$ is 25 mV and $V_N$ is 600 mV (the $V_{BE}$ of a transistor). Solving equation [2] for n using the desired room-temperature output voltage $V_O$ of 300 mV and the respective room-temperature values of $V_T$ and $V_N$ of 25 mV and 600 mV provides:

$$n = \frac{12}{m} + 24 \qquad \text{[EQ. 3]}$$

Variables n and m are selected such that the output voltage $V_O$ varies with temperature at the rate of 10 mV/°C. (i.e., $dV_O/dT$ 32 10 mV/°C.). Taking the derivative of equation [2] with respect to temperature T provides:

$$\frac{dV_o}{dT} = mn\frac{dV_T}{dT} - m\frac{dV_N}{dT} \qquad \text{[EQ. 4]}$$

Substituting 10 mV/°C., 0.1 mV/°C. and −2 mV/°C. for $dV_O/dT$, $V_T/dT$, and $V_N/dT$, respectively, into equation [4] and solving for n:

$$n = 100/m - 20 \qquad \text{[EQ. 5]}$$

Combining equations [3] and [5] and solving gives values n=30 and m=2.

Based on the foregoing analysis, the output voltage $V_O = 60V_T - 2V_N$. Of course, other values of m and n may be designated to provide different temperature-to-voltage characteristics.

FIG. 2 is a schematic diagram of a temperature-to-voltage converter 200 in accordance with one embodiment of the present invention. Converter 200 includes an input circuit 210 connected to the non-inverting input (+) of an operational amplifier 220 via a line 230. Operational amplifier 220 includes an output terminal 235 connected to ground potential via a pair of series-connected resistors $R_1$ and $R_2$. The common terminal between resistors $R_1$ and $R_2$ is connected, via a line 240, to an input terminal of a feedback circuit 250. Finally, feedback circuit 250 includes an output terminal connected, via a line 260, to the inverting input (−) of operational amplifier 220.

Input circuit 210 provides a positive temperature coefficient voltage $nV_T$ to the non-inverting input (+) of amplifier 220. In one embodiment, the positive temperature coefficient voltage $V_T$ varies with temperature at approximately n×0.1 mV/°C. Feedback circuit 250, on the other hand, provides a negative temperature coefficient voltage $V_N$ to the inverting input (−) of amplifier 220. In one embodiment, the negative temperature coefficient voltage $V_N$ is related to a base-to-emitter voltage (Vbe) of a transistor, and varies with temperature at approximately −2 mV/°C.

Series-connected resistors $R_1$, and $R_2$ form a voltage divider that provides an offset voltage $V_{OFF}$ to which is added voltage $V_N$. The sum of the voltages $V_{OFF}$ and $V_N$ is applied to the inverting input (−) of amplifier 220. Thus configured, the output voltage $V_O$ on output terminal 235 is:

$$V_O = (nV_T - V_N)m \qquad \text{[EQ. 6]}$$

where $$m = 1 + \frac{R_2}{R_1} \qquad \text{[EQ. 7]}$$

As discussed above in connection with FIG. 1, m is assumed to be set equal to 2; therefore, resistors $R_1$ and $R_2$ are equal. In one embodiment, resistors $R_1$ and $R_2$ are each 100KΩ.

FIG. 3 is a schematic diagram of an embodiment of converter 200 in which feedback circuit 250 includes a PNP transistor 252 and a current source 254 configured as a common-collector amplifier. In this configuration, the negative temperature coefficient voltage $V_N$ is the base-emitter voltage Vbe of transistor 252 (i.e., $V_N$=Vbe) . In one embodiment, current source 254 provides a constant current of 2 uA. The Vbe voltage provides an offset voltage which lowers the output voltage to enable the temperature sensor to operate with voltages as low as 2 volts.

FIG. 4 is a schematic diagram an embodiment of input circuit 210 of FIG. 2. Circuit 210 includes a pair of NPN transistors 410 and 415 each having an emitter connected to one terminal of a conventional current source 420 providing a current equal to 2I, where I is, for example, 2uA. The base and collector of transistor 410 are connected to a current source 425, which provides a current of 2I, and to the emitter of a PNP transistor 430. The collector of transistor 415 is connected to the base of an NPN output transistor 435 and to a current source 440, while the base of transistor 415 is connected to the emitter of a PNP transistor 445 and to a current source 450. Each of current sources 440 and 450 provides a current of I. Finally, the base of transistor 445 is connected to the emitter of transistor 435, to the base of transistor 430 via a resistor $R_T$, and to ground potential via resistor $R_T$ and a bias resistor $R_B$.

Because of current source 420, the collective current through transistors 410 and 415 is equal to 2I. Further, neglecting the base currents of transistors 415 and 435, the current through transistor 415 is equal to I. Subtracting the current (I) through transistor 415 from the total current (2I) through transistors 410 and 415 indicates that the current through transistor 410 must also be equal to I. Therefore, the currents through transistors 410 and 415 are equal.

It is commonly known in the art that the base-emitter voltage $V_{BE}$ of a transistor in the forward active region is dependent upon the current through that transistor and upon the saturation current $I_S$ for that transistor. This relationship may be expressed as follows:

$$V_{BE} = V_T \ln\frac{I}{I_S} \qquad \text{[EQ. 8]}$$

where I is the current through the transistor and $V_T$ is the thermal voltage (i.e., KT/q).

It is also commonly known in the art that the saturation current $I_S$ for a given transistor is dependent upon. the area of the base-emitter region of that transistor. The relationship between saturation current $I_S$ and base-emitter area A is conventionally expressed as follows:

$$I_S = \frac{qAn_i^2 D_n}{Q_B} \quad \text{[EQ. 9]}$$

where $D_n$ is the average effective value of the electron diffusion constant in the base, $n_i$ is the intrinsic carrier concentration in silicon, q is the charge of an electron, and $Q_B$ is the total base doping per unit area.

For purposes of the present application, the important aspect of the relationship expressed in equation 9 is that the saturation current $I_S$ varies linearly with base-emitter area A. Furthermore, referring back to equation 8, because saturation current $I_S$ varies with base-emitter area A, so too does the base-emitter voltage $V_{BE}$ vary with base-emitter area A.

The respective xA and A designations on transistors 410 and 415 indicate that the base-emitter area of transistor 410 is x-times greater than that of transistor 415. Furthermore, due to the relationship of equation 3, the saturation current $I_{S410}$ of transistor 410 is x-times greater than the saturation current $I_{S415}$ of transistor 415. Stated mathematically, $$I_{S410} = xI_{S415} \quad \text{[EQ. 10]}$$

Returning to equation 8, the base-emitter voltage $V_{BE410}$ of transistor 410 may be expressed as:

$$V_{BE410} = V_T \ln \frac{I}{I_{S410}} \quad \text{[EQ. 11]}$$

Substituting for IS410 using the relationship of equation 1091, equation 11 becomes:

$$V_{BE410} = V_T \ln \frac{I}{xI_{S415}} \quad \text{[EQ. 12]}$$

Again using equation 8, the base-emitter voltage $V_{BE415}$ of transistor 415 may be expressed as:

$$V_{BE415} = V_T \ln \frac{I}{I_{S415}} \quad \text{[EQ. 13]}$$

Because the emitters of transistors 410 and 415 are connected together, the voltages on the respective bases of transistors 410 and 415 differ by the magnitude of the difference between respective base-emitter voltages $V_{BE410}$ and $V_{BE415}$. Further, transistors 430 and 445, being of similar size and having equivalent collector currents I, exhibit equivalent base-emitter voltages. Consequently, the voltage difference between the bases of transistors 430 and 445 is equal to the magnitude of the difference between base-emitter voltages $V_{BE410}$ and $V_{BE415}$.

The voltage difference between the bases of transistors 430 and 445 is expressed across resistor $R_T$, and may be represented as $V_{BE415}$ minus $V_{BE410}$. Using equations 12 and 13, $$V_{BE415} - V_{BE410} = V_T \ln \frac{I}{I_{S415}} - V_T \ln \frac{I}{xI_{S415}} \quad \text{[EQ. 14]}$$

which reduces to:

$$V_{BE415} - V_{BE410} = V_T \ln(x) \quad \text{[EQ. 15]}$$

Once again neglecting base current, the reference voltage $V_R$ on terminal 455 may be expressed as:

$$V_R = V_T \ln(x)\left(1 + \frac{R_B}{R_T}\right) \quad \text{[EQ. 16]}$$

For a given circuit, the quantity $$\ln(x)\left(1 + \frac{R_B}{R_T}\right) \quad \text{[EQ. 17]}$$

is a constant. A designator n may be used to represent that constant, so that equation 16 reduces to $V_R = nV_T$, as indicated in FIG. 4. In an embodiment in which n equals 30, the value of x is 16 and the values of $R_T$ and $R_B$ are 30KΩ and 294.6KΩ, respectively.

FIG. 5 is a schematic diagram of a temperature-to-voltage converter 500 that combines the functions of input circuit 210, operational amplifier 220, and feedback circuit 250 of FIG. 2 into a low cost and highly efficient circuit. The temperature-to-voltage converter 500 may be operated with very low supply voltages.

Circuit 500 includes a pair of PNP transistors 510 and 515 each having an emitter connected to a collector of a transistor 517 configured as a conventional current source providing a current equal to 2I, where I is e.g., 2uA.

The base of transistor 517 is connected to the bases of transistors 550 and 555, which are in turn connected to a bias-voltage terminal $V_B$.

The collectors of transistors 510 and 515 are connected to the respective collectors of transistors 520 and 525, which are configured as a conventional current mirror 530. The base of transistor 510 is connected to ground potential via a bias resistor $R_B$, and to the base of transistor 515 via a resistor $R_T$.

Current mirror 530 forces the current through transistors 510 and 515 to be equal. As described above in connection with FIG. 4, the base-emitter voltage VBE of a given transistor depends upon the base-emitter area A of that transistor. The respective A and xA designations on transistors 510 and 515 indicate that the base-emitter area of transistor 515 is x-times greater than that of transistor 510.

Using the same analysis provided above in connection with FIG. 4, the reference voltage $nV_T$ on the base of transistor 515 may be expressed as:

$$nV_T = V_T \ln(x)\left(1 + \frac{R_B}{R_T}\right) \quad \text{[EQ. 18]}$$

As for the circuit of FIG. 4, the quantity $$\ln(x)\left(1 + \frac{R_B}{R_T}\right) \quad \text{[EQ. 19]}$$

may be represented as the constant n.

The voltage $nV_T$ is applied to the emitter of a transistor 535. The base-emitter voltage Vbe of transistor 535 shifts the voltage $nV_T$ down by the voltage Vbe so that the voltage ($nV_T$-Vbe) is available at the common connection of series-connected resistors $R_1$ and $R_2$. Resistors $R_1$ and $R_2$ form a voltage divider that determines the amplification factor m, as discussed above in connection with FIG. 2.

The output signal from differential pair 510, 515 is taken from the collector of transistor 510 to the base of a transistor 540, which amplifies the output signal and provides the amplified signal to the base of an output transistor 545. A compensation capacitor $C_c$, typically 20pF, is connected between the base and collector of transistor 540 to improve the AC response of temperature-to-voltage converter 500.

The various embodiments of temperature sensors in accordance with the present invention may be formed in a silicon substrate or located proximate to a silicon substrate to sense the temperature of the substrate. Thus configured, the output terminal of the temperature sensor may be connected to a control terminal to shut down a circuit's operation or to otherwise adjust the performance of an external circuit.

While particular embodiments of the present invention have been shown and described, it will be obvious to those skilled in the art that changes and modifications may be made without departing from this invention in its broader aspects. For example, a voltage with a positive temperature coefficient can be subtracted from or added to $nV_T$. The appended claims encompass within their scope all such changes and modifications.

What is claimed is:

1. A temperature-to-voltage converter comprising:
    a first input signal generator for generating a first input signal having a positive temperature coefficient;
    a second input signal generator for generating a second input signal having a voltage offset and a negative temperature coefficient;
    a first circuit connected to subtract said second input signal from said first input signal;
    wherein the first circuit is configured to output, on an output terminal, a difference signal generally proportional to the difference between the first input signal and the second input signal, said difference signal providing a voltage proportional to an ambient temperature for the temperature-to-voltage converter.

2. The converter of claim 1, further comprising an amplifier having an amplifier input terminal connected to the output terminal.

3. The converter of claim 1, further comprising a transistor including a base and an emitter, wherein the second input signal includes a voltage drop across the base and the emitter providing at least a portion of said voltage offset.

4. The converter of claim 1, wherein said first input signal generator forms part of the first circuit, and wherein the first circuit further comprises first and second transistors, connected as a differential amplifier, having respective first and second base-emitter areas, and wherein the first base-emitter area is greater than the second base-emitter area by a factor of x, said differential amplifier generating said first input signal having said positive temperature coefficient.

5. The converter of claim 1, wherein said output terminal is connected to ground via a resistor divider, a base of a transistor is connected to said resistor divider to receive a divided voltage, and an emitter of said transistor provides said second input signal.

6. The converter of claim 1, wherein said voltage offset is approximately 0.6 volts.

7. A method of generating a voltage proportional to temperature, the method comprising:
    generating a first signal having a positive temperature coefficient;
    generating a second signal having a voltage offset and a negative temperature coefficient; and
    subtracting the second signal from the first signal to obtain a voltage generally proportional to a temperature lowered by an amount related to said voltage offset.

8. A temperature-to-voltage converter comprising:
    an input circuit having an output node providing a first voltage level having a positive temperature coefficient;
    an amplifier having first and second amplifier input terminals and an amplifier output terminal, the first amplifier input terminal configured to receive the first voltage level; and
    a feedback circuit having a feedback input terminal connected to the amplifier output terminal and a feedback output terminal connected to one of the first and second amplifier input terminals, the feedback circuit developing a feedback voltage having a voltage offset and a negative temperature coefficient between the feedback input terminal and the feedback output terminal, an output of said amplifier providing a voltage proportional to an ambient temperature for the temperature-to-voltage converter.

9. The converter of claim 8, wherein the magnitude of the negative temperature coefficient is greater than the magnitude of the positive temperature coefficient.

10. The converter of claim 8, further comprising:
    a first resistor connected between the amplifier output terminal and the feedback input terminal; and
    a second resistor connected between the feedback input terminal and a fixed-voltage node.

11. The converter of claim 10, wherein the feedback circuit includes a current source connected to the feedback output terminal.

12. The converter of claim 10, wherein the feedback circuit includes a transistor connected in a common-collector configuration.

13. The converter of claim 8, wherein the first and second amplifier input terminals are operational amplifier input terminals.

14. The converter of claim 13, wherein the first amplifier input terminal is a non-inverting input terminal and the second amplifier input terminal is an inverting input terminal, and wherein the feedback output terminal is connected to the second amplifier input terminal.

15. A temperature-to-voltage converter comprising:
    means for providing, on an output node, a first voltage level having a positive temperature coefficient;
    an amplifier having first and second amplifier input terminals and an amplifier output terminal, the first amplifier input terminal configured to receive the first voltage level; and
    means for providing a feedback voltage having a voltage offset and a negative temperature coefficient between the output node and one of the first and second amplifier input terminals, an output of said amplifier providing a voltage proportional to an ambient temperature for the temperature-to-voltage converter.

16. The converter of claim 15, wherein the first voltage level is proportional to the thermal voltage $V_T$.

17. The converter of claim 15, wherein the second voltage level is proportional to the base-emitter voltage of a transistor.

* * * * *

UNITED STATES PATENT AND TRADEMARK OFFICE
CERTIFICATE OF CORRECTION

PATENT NO.    : 5,923,208
ISSUE DATE    : July 13, 1999
INVENTOR(S)   : Tasdighi et al.

It is certified that error appears in the above-identified patent and that said Letters Patent is hereby corrected as shown below:

Title page, after "Assignee" delete "Telecom" and insert --TelCom--.

Signed and Sealed this

Twenty-fifth Day of April, 2000

Attest:

Q. TODD DICKINSON

Attesting Officer    Director of Patents and Trademarks